(12) United States Patent
Foshee et al.

(10) Patent No.: US 8,803,699 B2
(45) Date of Patent: Aug. 12, 2014

(54) OBJECT DETECTION DEVICE (76) Inventors: George Brandon Foshee, Magnolia, AR (US); Timothy Allen Zigler, Crown King, AZ (US)

( * ) Notice: Subject to any disclaimer, the term of this patent is extended or adjusted under 35 U.S.C. 154(b) by 61 days.

(21) Appl. No.: 13/588,296

(22) Filed: Aug. 17, 2012

(65) Prior Publication Data
US 2013/0044005 A1 Feb. 21, 2013

Related U.S. Application Data (60) Provisional application No. 61/524,919, filed on Aug. 18, 2011, provisional application No. 61/604,241, filed on Feb. 28, 2012.

(51) Int. Cl.
G08B 21/00 (2006.01)
(52) U.S. Cl.
USPC ............ 340/686.6; 340/532; 340/691.1; 135/65; 434/112
(58) Field of Classification Search
USPC ........... 340/691.1–691.3, 532, 539.1, 539.23, 340/539.11, 686.1, 686.6, 4.1; 135/65; 434/112, 113
See application file for complete search history.

(56) References Cited

U.S. PATENT DOCUMENTS

| | | | |
|---|---|---|---|
| 3,383,682 A | 5/1968 | Stephens, Jr. | |
| 3,654,477 A | 4/1972 | Benjamin, Jr. | 250/217 SS |
| 3,987,403 A | 10/1976 | Smith | |
| 3,993,407 A * | 11/1976 | Moricca et al. | 356/3.14 |
| 4,761,770 A | 8/1988 | Kim | |
| 5,838,238 A * | 11/1998 | Abita et al. | 340/573.1 |
| 5,982,286 A * | 11/1999 | Vanmoor | 340/573.4 |
| 6,298,010 B1 * | 10/2001 | Ritz et al. | 367/116 |
| 6,977,579 B2 * | 12/2005 | Gilfix et al. | 340/407.1 |
| 7,267,281 B2 * | 9/2007 | Hopkins | 235/462.45 |
| 7,755,744 B1 * | 7/2010 | Leberer | 356/5.1 |
| 7,778,112 B2 * | 8/2010 | Behm et al. | 367/116 |
| 2007/0016425 A1 * | 1/2007 | Ward | 704/271 |

FOREIGN PATENT DOCUMENTS

| | | |
|---|---|---|
| CN | 2906645 | 5/2007 |
| CN | 201847889 | 6/2011 |
| DE | 3942093 | 5/1990 |
| DE | 10346466 | 6/2005 |
| DE | 102005032386 | 1/2007 |
| DE | 102008005164 | 7/2009 |
| EP | 2395495 | 12/2011 |
| GB | 2291551 | 1/1996 |

(Continued)

OTHER PUBLICATIONS

Ambutech Web Site www.ambutech.com printed Aug. 17, 2012.

(Continued)

*Primary Examiner* — Eric M Blount
(74) *Attorney, Agent, or Firm* — Stephen D. Schrantz; Schrantz Law Firm, PLLC (57) ABSTRACT

When the sight impaired become mobile, they often bump their heads on unseen objects and/or hazards that could result in injury. The object detection device uses signal emitting proximity sensors that alert the user to unseen objects. The object detection device notifies the user of detected objects. Stimulators contact the user to warn the user that an object has been detected and the distance between the object and the user. Each stimulator contacts the user at a specific contact point. The stimulator finger contacting the user at a specific contact point informs the user of the distance between the user and the detected object.

15 Claims, 10 Drawing Sheets

(56) References Cited

FOREIGN PATENT DOCUMENTS

| GR | 1003994 | 9/2002 |
|---|---|---|
| IT | WO9717043 | 5/1997 |
| WO | WO 9717043 A1 * | 5/1997 |

OTHER PUBLICATIONS

Sasaki, Tadayuki; Peng, Chen, "A blind mobility aid modeled after echolocation of bats", IEEE Transactions on Biomedical Engineering, pp. 461-465, vol. 38, Issue 5. Available at http://ieeexplore.ieee.org/xpl/freeabs_all.jsp?arnumber=81565. Printed on Mar. 25, 2013.

Flavien Maingreaud; Edwige Pissaloux; Charlène Orange; Christophe Leroux, Validation of a dynamic electronic obstacles map. Conference and workshop on assistive technologies for vision and hearing impairment, Grenade, Spain, 29 Available at http://citeseerx.ist.psu.edu/viewdoc/summary?doi=10.1.1.100.1834. Printed on Mar. 25, 2013.

Andò, Bruno, Electronic sensory systems for the visually impaired, IEEE Instrumentation & Measurement Magazine, pp. 62-67. Available at http://ieeexplore.ieee.org/xpl/freeabs_all.jsp?arnumber=1200287 Printed on Mar. 25, 2013.

Chen-Fu Liao; Mick Rakauskas; Avanish Rayankula; Development of Mobile Accessible Pedestrian Signals (MAPS) for Blind Pedestrians at Signalized Intersections, Report No. CTS 11-11. Available at http://www.its.umn.edu/Publications/ResearchReports/pdfdownload.pl?id=1552 and available at http://www.its.umn.edu/Publications/ResearchReports/reportdetail.html?id=2040 Printed on Mar. 25, 2013.

'Bionic Eye' Implant Offers Hope to the Blind. http://news.discovery.com/tech/bionic-eye-implant-offers-hope-blind-110405.htm. Printed on Mar. 25, 2013.

Ben Coxworth, EYE 21 system lets the blind 'see' by assigning sounds to shapes. Available at http://www.gizmag.com/eye-21-sound-system-for-blind/19138/ Printed on Mar. 25, 2013.

Sonic Pathfinder. Available at http://www.abledata.com/abledata.cfm?pageid=19327&top=10267&ksectionid=19327&productid=74626&trail=0&discontinued=0 Printed on Mar. 25, 2013.

* cited by examiner

OBJECT DETECTION DEVICE

CROSS-REFERENCE TO RELATED APPLICATIONS

This application claims priority to and is a continuation-in-part of U.S. Patent Application No. 61/524,919 filed on Aug. 18, 2011 entitled DEVICE TO AID THE BLIND BY ALERTING THE USER OF UNSEEN OBSTACLES. This application also claims priority to and is a continuation-in-part of U.S. Patent Application No. 61/604,241 filed on Feb. 28, 2012 entitled FAUXSEE GLASSES.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

This invention relates generally to an object detection device that alerts users to objects in the vicinity of the user. More specifically, the object detection device provides a frame placed on the user's head. Multiple adjustable fingers mounted on the frame adjust between a detected position and a clear position. The adjustable fingers in the detected position notify the user that an object has been detected at a specific region. The adjustable fingers in the clear position notify the user that an object has not been detected at a specified region. The object detection device also notifies the distance between the detected object and the user.

DESCRIPTION OF THE KNOWN ART

Patents and patent applications disclosing relevant information are disclosed below. These patents and patent applications are hereby expressly incorporated by reference in their entirety.

U.S. Pat. No. 3,383,682 issued to Stephens on May 14, 1968 ("the '682 patent") teaches a navigational method and apparatus for blind persons incorporated in a pair of eye glasses, at least one temple portion of which comprises a directional antenna for both transmitting and receiving signals and a heel portion of which contains a single circuitry unit to generate signals at a predetermined frequency and receive and amplify echoed signals having frequencies different from the transmitted frequency. The '682 patent also teaches a detectable warning system connected into the receiving and amplifying circuitry unit communicates the amplified signal to the person using the apparatus.

U.S. Pat. No. 3,654,477 issued to Benjamin on Apr. 4, 1972 ("the '477 patent") teaches an obstacle detection device for the blind. The '477 patent teaches that a light source is pulsed on to produce a pulse of light which is reflected by an obstacle. The reflected light taught by the '477 patent is received adjacent the coherent light source and the time between the transmission and reception of the pulse is used to measure the relatively short distances involved. The '477 patent also teaches a tactile stimulator directed to a sensitive body area supported on the same frame employs material which changes shape when temperature exceeds a critical level and returns to its original shape when cooled below that temperature such that internal resistance of the material under the effect of AC current constantly cyclically changes above and below the critical temperature.

The known art only notifies a user than an object is present. The known art does not provide a system that uses physical contact to alert users of the distance between the user and the object. Therefore, the present invention is needed to improve the information provided to the user. The present invention communicates the distance between the user and the object. The present invention is also needed to improve the user's navigation through an area. The present invention is also needed to alert users of objects in multiple directions.

SUMMARY OF THE INVENTION

One embodiment of the object detection device may be used by the visually impaired to inform the user of objects that are at or near the user's head. Currently, the two major advances in technology to aid the mobility of the visually impaired are the cane and the guide dog. Both the cane and the guide dog are designed to protect the user from tripping hazards and/or lower body injury. The present invention may be used in conjunction with such devices to give the user a safer experience and more protection for the user's upper body while in motion.

The object detection device of the present invention alerts users to objects in the vicinity of the user. The object detection device helps the visually impaired detect and navigate around obstacles. Stimulators of the present invention contact the user at different contact points to inform the user of the proximity of the detected objects. The object detection device also informs users of objects that may not have been detected by the user. One embodiment of the object detection device is designed to be worn on a user. Different embodiments may be worn on a user's head, clothing, belt, arm bands, or otherwise attached to the user. Other embodiments may be implemented in vehicles to inform users of objects in close proximity to the vehicle.

Such an embodiment provides a housing that may be worn by the user. The housing may be attached to the user's clothing, a hat, or may be installed on a pair of glasses to be placed on the user's head. Multiple stimulator fingers mounted on the frame adjust between a detected position and a clear position. The stimulator fingers in the detected position notify the user that an object has been detected at a specific region. The stimulator fingers in the clear position notify the user that an object has not been detected at a specified region. The object detection device also notifies the distance between the detected object and the user. The stimulators contact the user at different contact points to notify the user of the distance of the object.

It is an object of the present invention to notify users of the location and distance of a detected job.

It is another object of the present invention to alert users of potential dangers.

It is another object of the present invention to inform users of distances to detected objects.

It is another object of the present invention to provide users with advanced notice of a detected object.

It is another object of the present invention to make contact with users at different contact points to inform users of the distances of detected objects.

It is another object of the present invention to inform the user of the speed at which an object approaches a user.

It is another object of the present invention to inform the user of the speed at which the user approaches an object.

It is another object of present invention to notify the user whether an object detected favors the user's left, right, or both.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The object detection device of the present invention may be used by the visually impaired to inform the user of objects that are at or near the user. The object detection device is generally shown as 100. The object detection device 100 alerts users to objects in the vicinity of the user. The object detection device 100 is designed to be worn on a user. Different embodiments may be worn on a user's head, clothing, belt, arm bands, or otherwise attached to the user. Other embodiments may be implemented in vehicles to inform users of objects in close proximity to the vehicle. The object detection device informs users of objects that may not have been detected by the user.

The object detection device 100 uses at least one sensor 102, 104 for detecting objects. Sensors 102, 104 may be an electronic component that can both send and/or receive signals. Such sensors of the present invention may include but are not limited to ultrasonic, infrared, electromagnetic, laser, or any other device capable of sending and receiving signals for the purpose of detecting objects. In one embodiment, the sensor can relate the proximity of the object to the user with the application of voltage. Other embodiments of the sensors 102, 104 may produce signals in a non-ultrasonic wave, such as infrared or laser, for gathering information such as heat detection or metal objects to provide the user with more information about the user's surroundings. The sensors may also be a combination of the above mentioned sensors.

The object detection device 100 may also include additional sensors that perform task specific functions, including but not limited to wide beam sensors and narrow beam sensors. The wide beam sensors detect a broader field for obstacles or lack thereof. A narrow beam sensor could be used for pinpointing obstacles. In a similar manner, a single sensor could gather the information. The stimulator control analyzes the information from the sensor to determine the positioning (right, left, front, rear, etc.), pinpointing, object size, etc.

In another embodiment, the object detection device may include a camera in communication with a computing device. Such an embodiment may implement face recognition and object recognition software to provide the user with additional information regarding the detected objects. Such additional features would also allow the user to use money recognition software so that the user can recognize the currency. The object detection device may also include a microphone to capture audio. The user could capture audio to convert speech to text via a dictation application.

Figure 1:
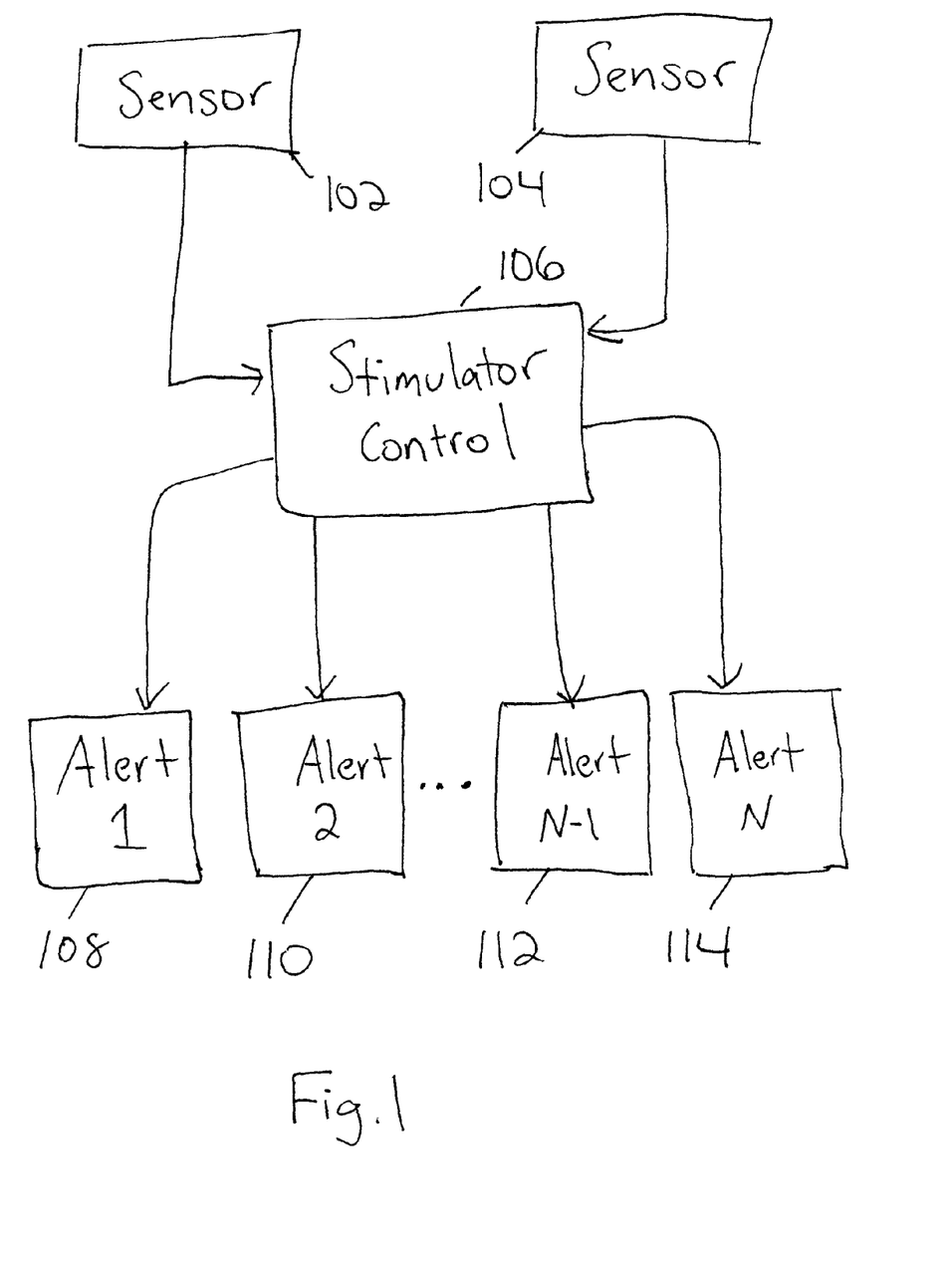
FIG. 1 is a schematic view of one embodiment of the present invention.

FIG. 1 shows a number of components of the object detection device 100. The sensors may include known sensors, such as back up sensors found on automobiles. Each sensor sends and receives signals to detect objects to determine the distance between the detected object and the sensor. In one embodiment, each sensor may control at least one alert system. In another embodiment, one sensor may control multiple alert systems. The sensors 102, 104, communicate with a stimulator control 106. The stimulator control 106 may include, but is not limited to, a processor, a circuit board, a smart phone, a computer, or other computing device. The stimulator control 106 processes the information from the sensors to activate the appropriate alert systems. The use of a smart phone or computing device may provide the user with increased functionality such as additional computing power, the use of GPS features, and other applications such as face recognition, color recognition, object recognition, and money recognition.

The stimulator control 106 is also in communication with at least one alert system 108, 110, 112, 114. The stimulator control 106 provides signals to the alert system 108, 110, 112, 114 to activate the appropriate alert system 108, 110, 112, 114. Multiple alert systems 108, 110, 112, 114 may be utilized by the object detection device 100. The stimulator control 106 activates specific alert systems when the objects are within the designated range. The sensors, stimulator control, and alert systems may be hard wired together or may communicate wirelessly.

The object detection device 100 also includes a power supply such as batteries or a rechargeable power source. The object detection device 100 preferably uses a portable power source. In another embodiment, the object detection device 100 uses a wired power source.

Figure 2:
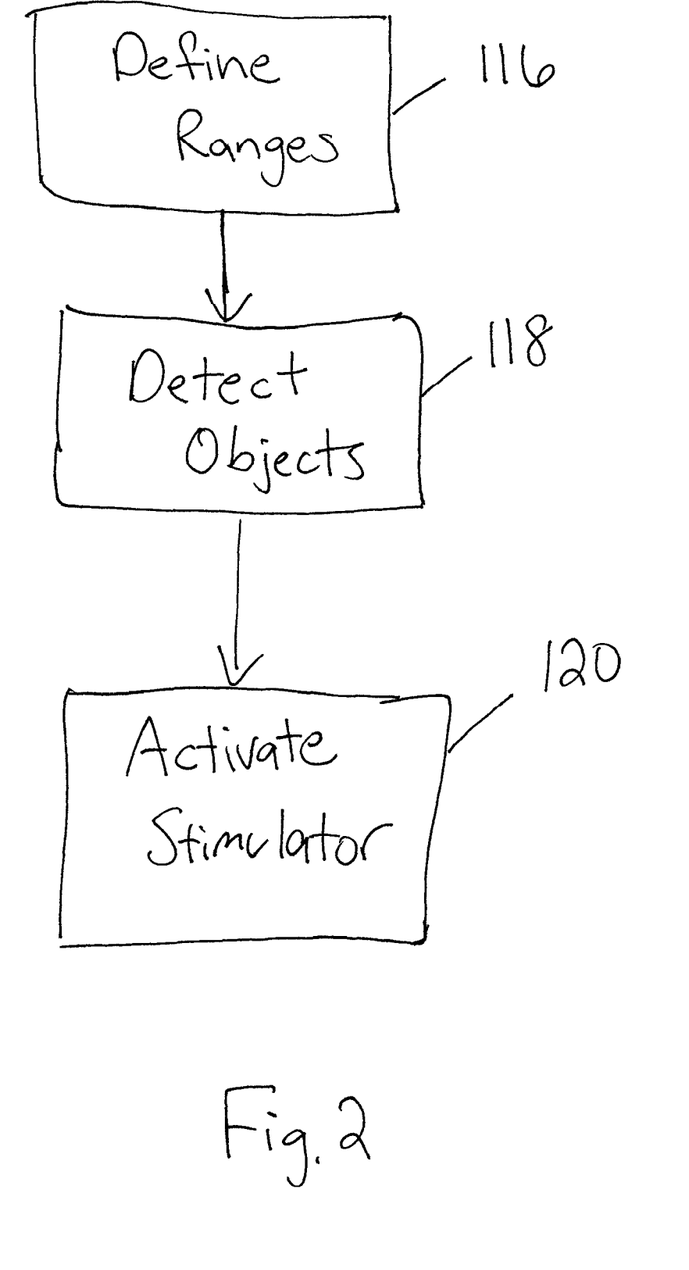
FIG. 2 is a flowchart showing one process of one embodiment of the present invention.
Figure 3:
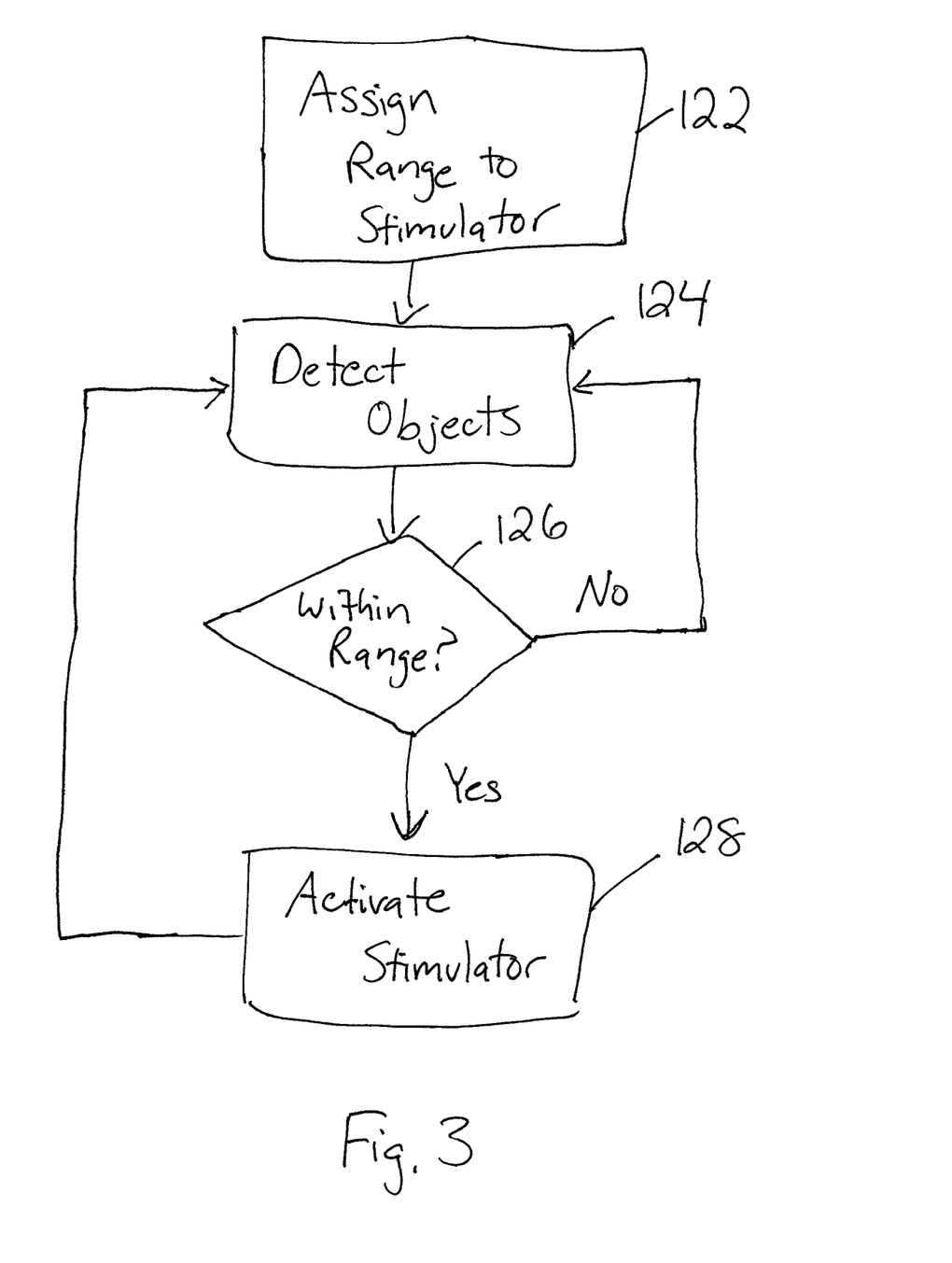
FIG. 3 is a flowchart showing one process of one embodiment of the present invention.

FIGS. 2 and 3 show the operation of the object detection device 100. To provide information to the user, the ranges of the object detection device 100 are defined at Define Ranges Step 116. Each alert system may be constructed from multiple stimulators. The number of stimulators can range from at least one mobile stimulator to multiple stimulators. In one embodiment, the stimulators may be constructed from servo motors or solenoids. The alert system of one embodiment may be constructed from five stimulators located along the stems of a pair of glasses.

Each stimulator finger alerts a user that an object has been detected within a certain distance from the user. A stimulator finger of each stimulator adjusts between a detected position and a clear position. The stimulator finger in the detected position informs the user that an object has been detected within a specific range from the user. The stimulator finger in the clear position informs the user that no object has been detected within a specific range from the user.

In one embodiment, the stimulator finger alerts the user that an object has been detected by contacting the user at defined contact points. Each contact point is assigned a distance range. One embodiment of the present invention utilizes a stimulator located at each contact point. Another embodiment utilizes a stimulator transport that moves the stimulator to the contact point.

For example, in one embodiment constructed with five stimulators located at five different contact points, the object detection device begins warning a user that the user is within five feet from an object. In such an embodiment, the first contact point is defined at five feet. Each additional contact point is defined at one foot increments. For example, the second contact point is defined at four feet. The third contact point is defined at three feet. The fourth contact point is defined at two feet, and the fifth contact point is defined at one foot. Each stimulator finger adjusts to the detected position at the defined contact point when an object is detected. For example, if an object is detected at three feet away from the user, the stimulator located at the third contact point will be activated to contact the person at the third contact point. In one embodiment, only the stimulator finger at the third contact point is adjusted to the detected position. In another embodiment, the stimulator fingers located at the first, second, and third contact points are adjusted to the detected position as an object is detected within five, four, and three feet away.

While only one set of contact points may be defined, the present invention may also include multiple modes in which different ranges are defined for the contact points. One embodiment of the present invention could include, but not be limited to, three modes. The first mode could be an outdoor mode which would detect a longer field of view which could begin notifying users that an object has been detected twelve feet away. In open spaces, a longer detection field would be ideal due to the fact that fewer obstacles are expected to be found in wide open spaces. In addition, these obstacles found in open spaces will be located further apart. The outdoor mode will give the user more reaction time to make navigation decisions based on the results of the real time information given to the user.

The second mode of operation, an indoor mode, could begin notifying users that an object has been detected six feet away. Because the indoor mode is providing information on a smaller distance range, each contact point provides information regarding a smaller distance increment. Therefore, the indoor mode allows the user to gather more detailed information as each contact point represents a smaller distance range.

The third mode of operation, a pinpoint mode, would broadcast a smaller field of view, preferably but not limited to, an eight inch diameter field of view at a distance of about four feet. The pinpoint mode provides the user with more detailed information about a single object to give the user a sense of topography of the object. In the pinpoint mode, the range has been decreased to allow the system to alert the user of slight anomalies, such as a place setting at a table.

The user may customize the ranges of the contact points according to the user's needs. The user may define an alert distance to customize when the object detection device will begin alerting the user. The alert distance may then be divided equally among the contact points to define the distance increments associated with each contact point. The stimulator control will then activate the stimulator at the contact point to alert the user of the distance of the detected object. For example, each contact point could be assigned a range according to the following formula: Range of contact point=Alert Distance/Number of Contact Points.

In an object detection device constructed of five stimulators, the range of a contact point when detecting an alert distance of fifteen feet will be assigned three feet increments. Likewise, the range of a contact point when detecting an alert distance of ten feet will be assigned two feet increments. The range of a contact point when detecting an alert distance of five feet will be assigned one foot increments.

Table for fifteen feet alert distance with five stimulators and three feet increments. Activating multiple stimulators.

| Stimulator Contact Point Number | Minimum Distance To Activate to Detected Position | Maximum Distance |
| --- | --- | --- |
| 1 | 0 | 15 |
| 2 | 0 | 12 |
| 3 | 0 | 9 |
| 4 | 0 | 6 |
| 5 | 0 | 3 |

Table for ten feet alert distance with five stimulators and two feet increments. Activating multiple stimulators.

| Stimulator Contact Point Number | Minimum Distance To Activate to Detected Position | Maximum Distance |
| --- | --- | --- |
| 1 | 0 | 10 |
| 2 | 0 | 8 |
| 3 | 0 | 6 |
| 4 | 0 | 4 |
| 5 | 0 | 2 |

Table for five feet alert distance with five stimulators and one foot increments. Activating multiple stimulators.

| Stimulator Contact Point Number | Minimum Distance To Activate to Detected Position | Maximum Distance |
| --- | --- | --- |
| 1 | 0 | 5 |
| 2 | 0 | 4 |
| 3 | 0 | 3 |
| 4 | 0 | 2 |
| 5 | 0 | 1 |

Table for fifteen feet alert distance with five stimulators and three feet increments. Activating only one stimulator contact point.

| Stimulator Contact Point Number | Minimum Distance To Activate to Detected Position | Maximum Distance |
| --- | --- | --- |
| 1 | >12 | 15 |
| 2 | >9 | 12 |

-continued

| Stimulator Contact Point Number | Minimum Distance To Activate to Detected Position | Maximum Distance |
|---|---|---|
| 3 | >6 | 9 |
| 4 | >3 | 6 |
| 5 | 0 | 3 |

Table for ten feet alert distance with five stimulators and two feet increments. Activating only one stimulator contact point.

| Stimulator Contact Point Number | Minimum Distance To Activate to Detected Position | Maximum Distance |
|---|---|---|
| 1 | >8 | 10 |
| 2 | >6 | 8 |
| 3 | >4 | 6 |
| 4 | >2 | 4 |
| 5 | 0 | 2 |

Table for five feet alert distance with five stimulators and one foot increments. Activating only one stimulator contact point.

| Stimulator Contact Point Number | Minimum Distance To Activate to Detected Position | Maximum Distance |
|---|---|---|
| 1 | >4 | 5 |
| 2 | >3 | 4 |
| 3 | >2 | 3 |
| 4 | >1 | 2 |
| 5 | 0 | 1 |

In another embodiment, the user customizes the contact points for any desired range. The user may program different increments for each contact point. The user may program the stimulator control. In other embodiments, the user may request a circuit board for the desired ranges.

Continuing to refer to FIG. 2, the object detection device, when powered on, detects objects at Detect Objects Step 118. The sensors search for objects. If an object is detected, sensor sends information to the stimulator control 106 informing the stimulator control 106 of the object. If the detected object is within the designated range, the stimulator control 106 activates the associated stimulator to notify the user that an object has been detected at Activate Stimulator Step 120.

FIG. 3 provides more detailed information regarding the process. The stimulator is assigned a range as described above at Assign Range Step 122. The sensors then begin to detect objects at detect objects 124. Known sensors and detection systems may be used in the present invention. A back up warning system for an automobile or a similar system may be implemented as the sensor in the present invention.

The object detection device emits a constant signal to determine the distance of any objects in the user's natural field of vision. The sensor measures the time for the signal to be emitted and return. Given the time required for the signal to return, the stimulator controller or other computing device can determine distance between the sensor and the object.

As the sensor detects an object, the sensor provides the information to the stimulator control 106 to determine whether the object is within range at Within Range Query 126. If the object is within the appropriate range, the stimulator control 106 activates the appropriate stimulator at Activate Stimulator 128. The stimulator control 106 of an embodiment using multiple stimulators determines which stimulators should be activated. Each of these stimulators is located at a different contact point. The stimulator control 106 activates the appropriate stimulators according to the location of the detected object. In another embodiment using a stimulator transport, the stimulator control 106 positions the stimulator to the appropriate contact point. The stimulator is moved in position on the user according to the location of the object as will be discussed below.

Figure 4:
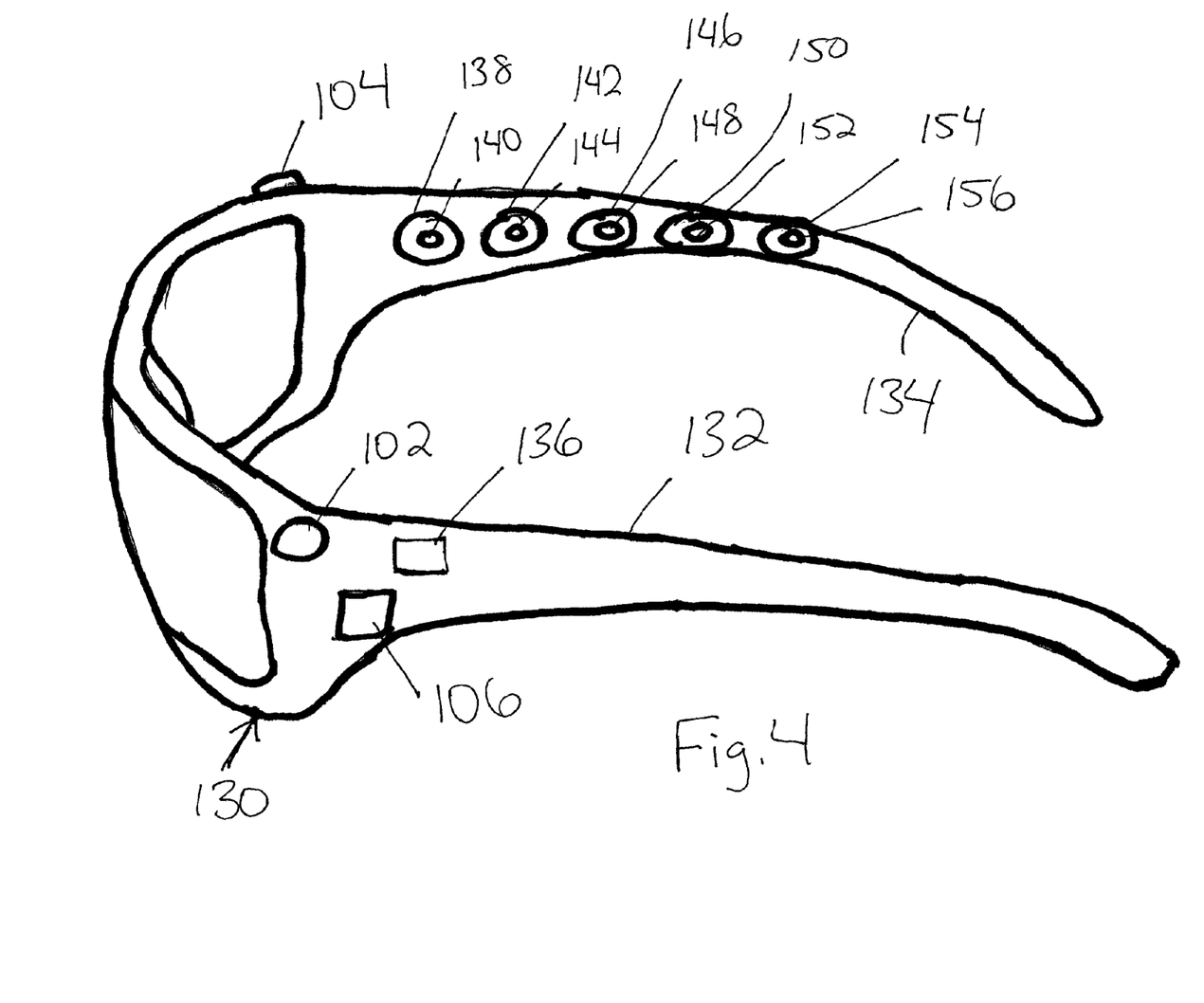
FIG. 4 is a perspective view of one embodiment of the present invention.

FIG. 4 shows a perspective view of one embodiment of the present invention in which the sensors 102, 104 and stimulators 138, 142, 146, 150, 154 are installed on a pair of glasses 130. Sensors 102, 104 are located at the front of the glasses to detect objects in the user's field of vision. A power toggle 136 allows the user to power on and off the object detection device 100. The stimulator control 106 located on the glasses communicates with the sensors 102, 104 to activate the appropriate stimulators 138, 142, 146, 150, 154.

Figure 5:
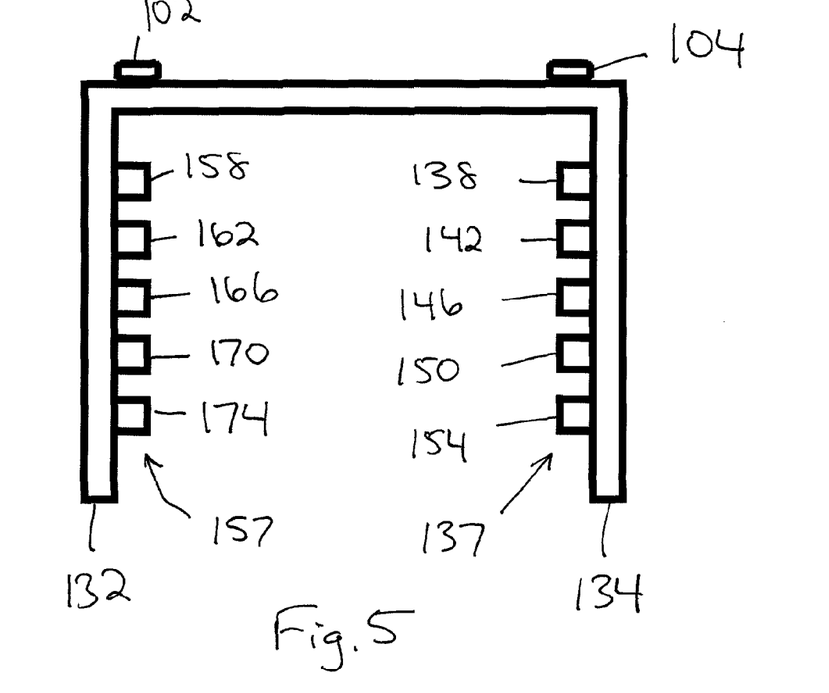
FIG. 5 is a top view of one embodiment of the present invention.

Referring to FIGS. 4-5, stimulators 138, 142, 146, 150, 154, 158, 162, 166, 170, 174 are located along stems 132, 134 of glasses 130. Each stimulator is located along a path from the front of the stem 134 towards the temple to the rear of the stem 134 towards the ear. Each stimulator provides a stimulator finger, such as stimulator fingers 140, 144, 148, 152, 156, 160, 164, 168, 172, 176. Each stimulator finger adjusts between a detected position and a clear position. The stimulator control 106 activates the stimulators to adjust the stimulation fingers between the detected position and the clear position.

The stimulators may belong to a stimulator set that provides the user with information regarding the distance of the detected object to the sensor. FIGS. 5-10 show stimulator set 137 constructed from stimulators 138, 142, 146, 150, 154 and stimulator set 157 constructed from stimulators 158, 162, 166, 170, 174.

Each stimulator set 137, 157 informs the user of the distance to the detected object. The stimulators of each stimulator set form a path from the front of stems 132, 134 to the rear of stems 132, 134. In one embodiment, the each stimulator is assigned a distance range having a maximum distance and a minimum distance. Each stimulator adjusts its stimulator finger to the detected position when an object has been detected within the distance range of the stimulator. In one embodiment, the minimum distance of each distance range may be equal as described herein. The minimum distance of another embodiment may differ as described herein.

The maximum distances of each distance range should vary to provide the user with information regarding the distance to the detected object. For example, in one embodiment of a stimulator set 137, the maximum distance of stimulator 138 will be greater than stimulators 142, 146, 150, 154. The maximum distance of stimulator 142 will be greater than stimulators 146, 150, 154. The maximum distance of stimulator 146 will be greater than stimulators 150, 154. The maximum distance of stimulator 150 will be greater than stimulator 154. In this embodiment, stimulator 138 activates at the farthest distance and stimulator 154 activates at the closest distance. Each stimulator sequentially activates to adjust the associated stimulator finger to the detected position until the last stimulator 154 activates. Therefore, as a user approaches an object, the stimulators will activate sequentially starting at stimulator 138 to stimulator 142 to stimulator 146 to stimulator 150 to stimulator 154. As a user backs away from an object, the stimulators will activate sequentially starting at stimulator 154 to stimulator 150 to stimulator 1146 to stimulator 142 to stimulator 138. Stimulator set 157 may be configured the same as stimulator set 137. In another embodiment, the stimulator sets may vary.

In another embodiment, the path of the stimulator set may be reversed from the path described above. In such an embodiment, the maximum distance of stimulator 138 will be less than stimulators 142, 146, 150, 154. The maximum distance of stimulator 142 will be less than stimulators 146, 150, 154. The maximum distance of stimulator 146 will be less than stimulators 150, 154. The maximum distance of stimulator 150 will be less than stimulator 154. In this embodiment, stimulator 154 activates at the farthest distance and stimulator 138 activates at the closest distance. Each stimulator sequentially activates to adjust the associated stimulator finger to the detected position until the last stimulator 138 activates. Therefore, as a user approaches an object, the stimulators will activate sequentially starting at stimulator 154 to stimulator 150 to stimulator 1146 to stimulator 142 to stimulator 138. As a user backs away from an object, the stimulators will activate sequentially starting at stimulator 138 to stimulator 142 to stimulator 146 to stimulator 150 to stimulator 154. Stimulator set 157 may be configured the same as stimulator set 137.

Figure 6:
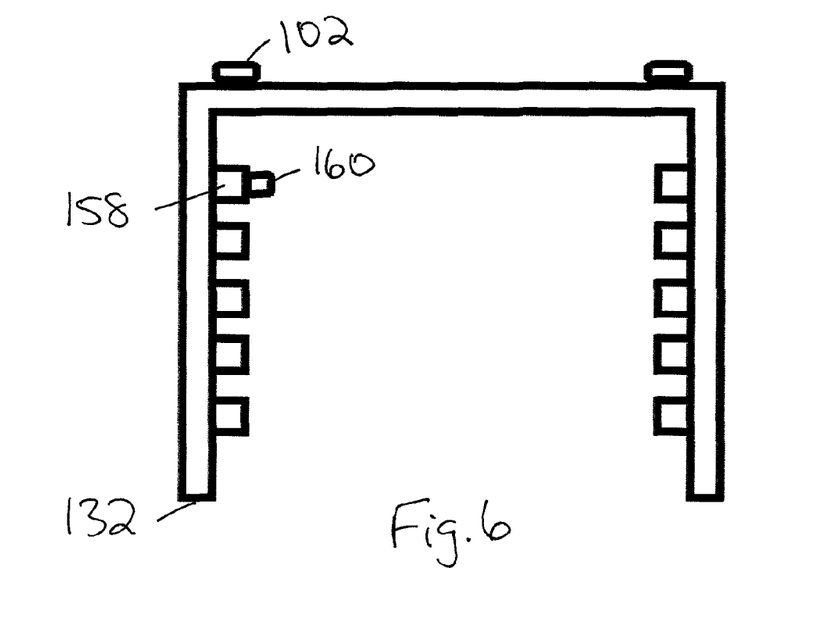
FIG. 6 is a top view thereof.
Figure 7:
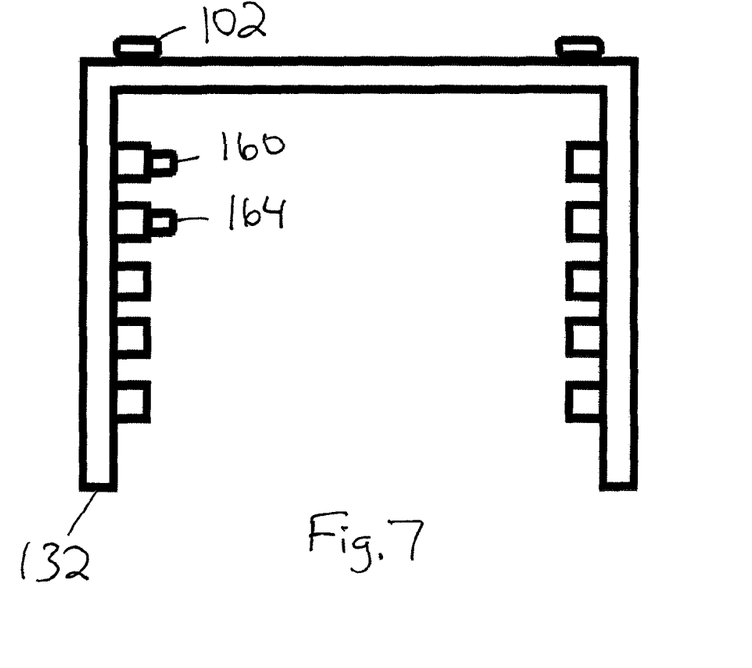
FIG. 7 is a top view thereof.
Figure 8:
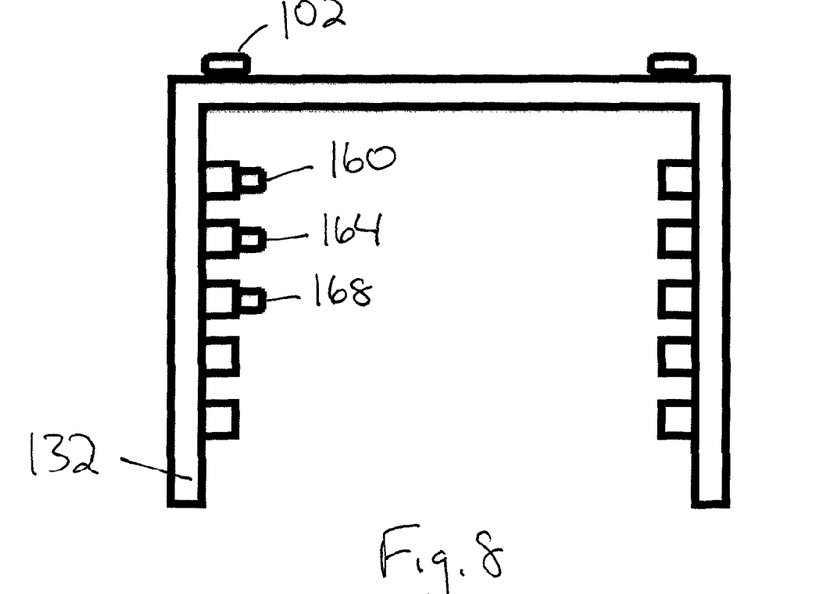
FIG. 8 is a top view thereof.
Figure 9:
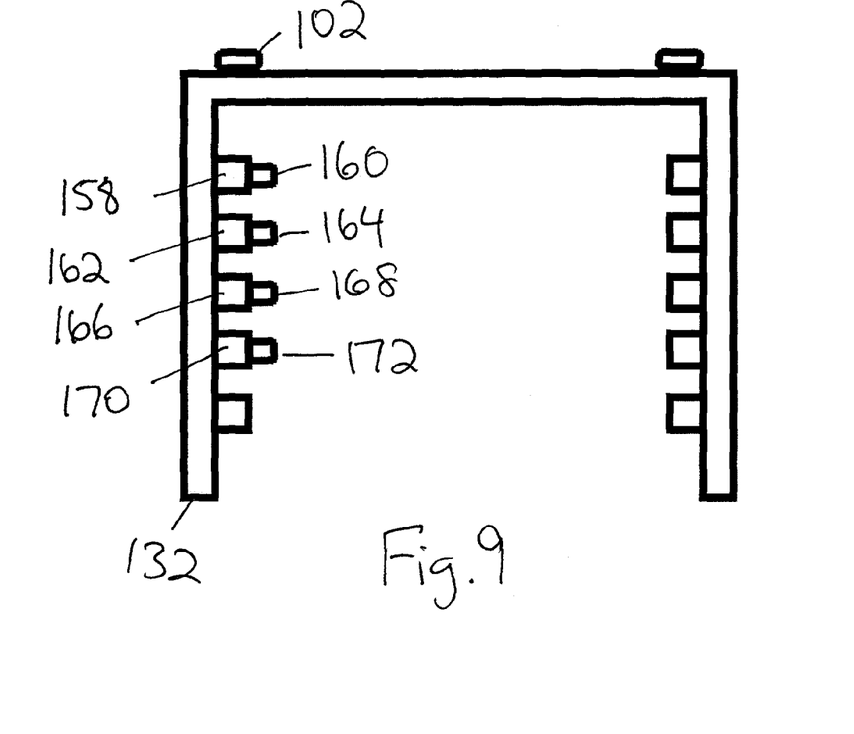
FIG. 9 is a top view thereof.
Figure 10:
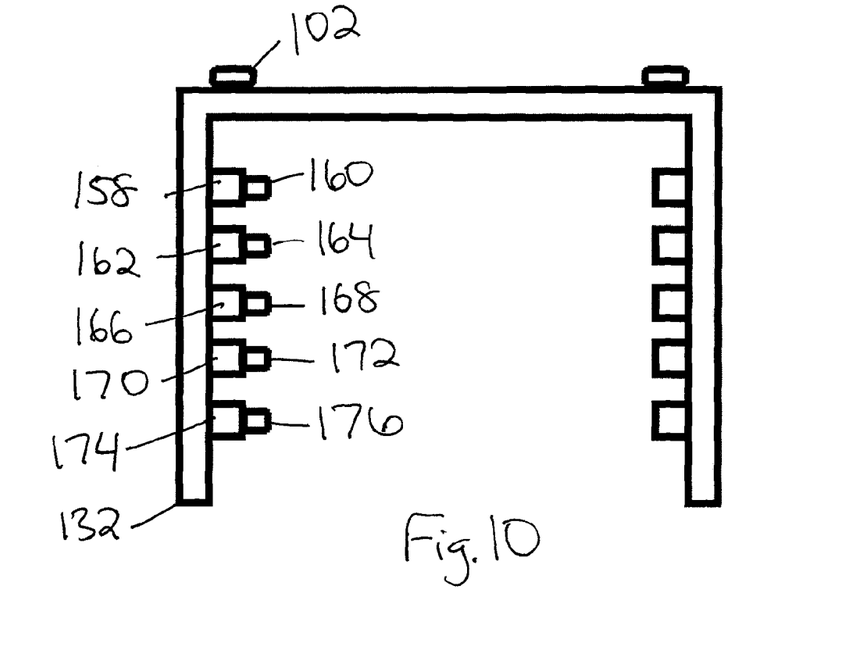
FIG. 10 is a top view thereof.

In one embodiment, the stimulator finger in the detected position extends outward from the stimulator to contact the user. The stimulator finger retracts into the stimulator when the stimulator finger is in the clear position. FIG. 5 shows the stimulator finger 160 retracted into stimulator 158 for the clear position. FIG. 6 shows the stimulator finger 160 in the detected position extending outward from stimulator 158. In another embodiment, the positions may be reversed such that the stimulator finger in the detected position is retracted into the stimulator.

The stimulators of one embodiment of the present invention may be constructed from solenoids, servo motors, or other devices that can be used to apply pressure to an object to create contact with the user. The stimulator control 106 applies power to the stimulator according to the specified ranges to activate the stimulator. Activating the stimulator causes the stimulator finger to adjust to the detected position to contact the user. The pressure applied to the user warns the user of the detected object and the distance to the detected object.

In one embodiment, a set of five stimulators are attached to each stem of a pair of glasses which apply a slight pressure to the user as the user approaches an object. Each stimulator represents one foot. The set of stimulators on the left stem represents objects detected in the user's left periphery. The set of stimulators on the right stem represents objects detected in the user's right periphery.

For example, if a user directly approaches a solid block wall, the user will experience a slight sensation from the stimulators closest to the user's eyes on both sides at a distance of five feet from the wall. As the user approaches the wall, each subsequent stimulator on both stems will energize incrementally every foot that the user approaches the wall. The pressure of each subsequent stimulator informs the user that the user is one foot closer to the wall. If the user continues towards the wall, the fifth and final stimulator will energize to apply pressure to the user which indicates that the user is almost in contact with the wall. If the user then walks backwards from the wall, the stimulators would de-energize in order at one foot increments until none of the stimulators were contacting the user's face. The user would then know that he was at least five feet away from the wall.

All of the stimulator fingers shown in FIG. 5 are in the clear position in which the stimulator fingers are retracted into the appropriate stimulators. In this embodiment, stimulators 158, 162, 166, 170, 174 activate according to objects detected by sensor 102. Such a relationship between sensor 102, stimulator set 157, and stimulators 158, 162, 166, 170, 174 enables a user to quickly associate the activation of such stimulators with the detection of an object towards the right portion of the user's field of vision. Sensor 104 controls stimulators 138, 142, 146, 150, 154. Likewise, the relationship between sensor 104, stimulator set 137, and stimulators 138, 142, 146, 150, 154 enables a user to quickly associate the activation of such stimulators with the detection of an object towards the left portion of the user's field of vision. In another embodiment, one sensor can distinguish the different sides such that the stimulator control can activate stimulators on both sides.

FIGS. 5-10 show the process of alerting a user to an object. The object may be approaching the user and/or the user may be approaching the object. As shown in FIG. 5, the sensor 102 has not detected an object within range. As the user becomes closer to the object, the first stimulator 158 adjusts the stimulator finger 160 into the detected position as shown in FIG. 6. The stimulator finger 160 contacts the user at the first contact point. Such contact warns the user that an object has been detected towards the left portion of the user's field of vision.

As the distance between the user and the detected object decreases, more stimulators are activated to contact the user. FIGS. 7-10 show the activation of the additional stimulator fingers 160, 164, 168, 172, 176 to the detected position to warn the user of the object. As shown in this embodiment, the stimulators remain in the detected position as the distance between the user and the object decreases. Each additional stimulator finger adjusted to the detected position warns the user that the distance between the user and the object has decreased. As indicated in FIGS. 5-10, the stimulator fingers adjust to the detected position in an approximately linear manner starting from the temple towards the ear.

Figure 11:
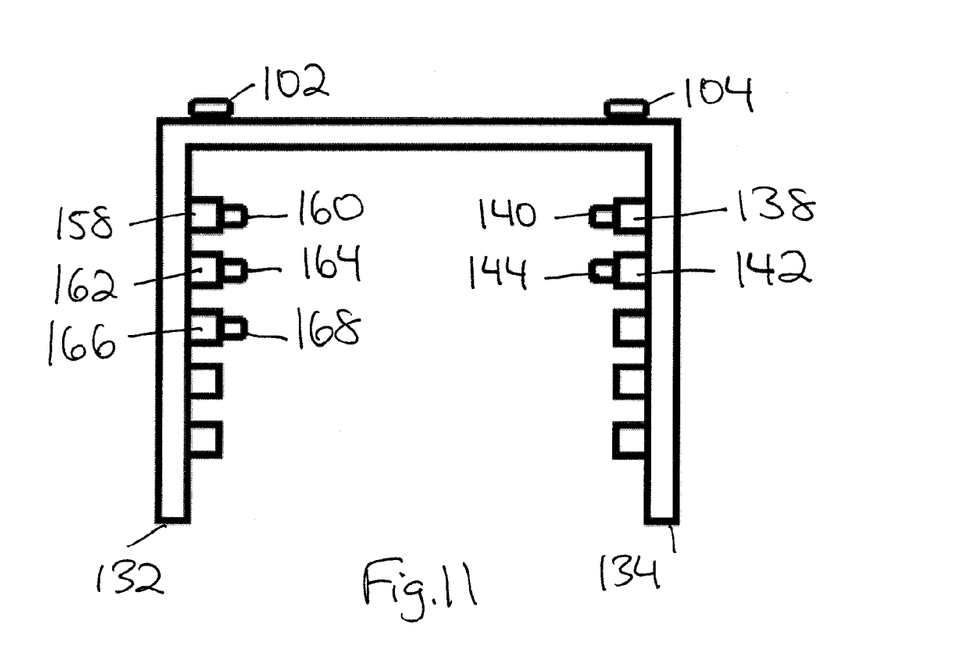
FIG. 11 is a top view thereof.
Figure 12:
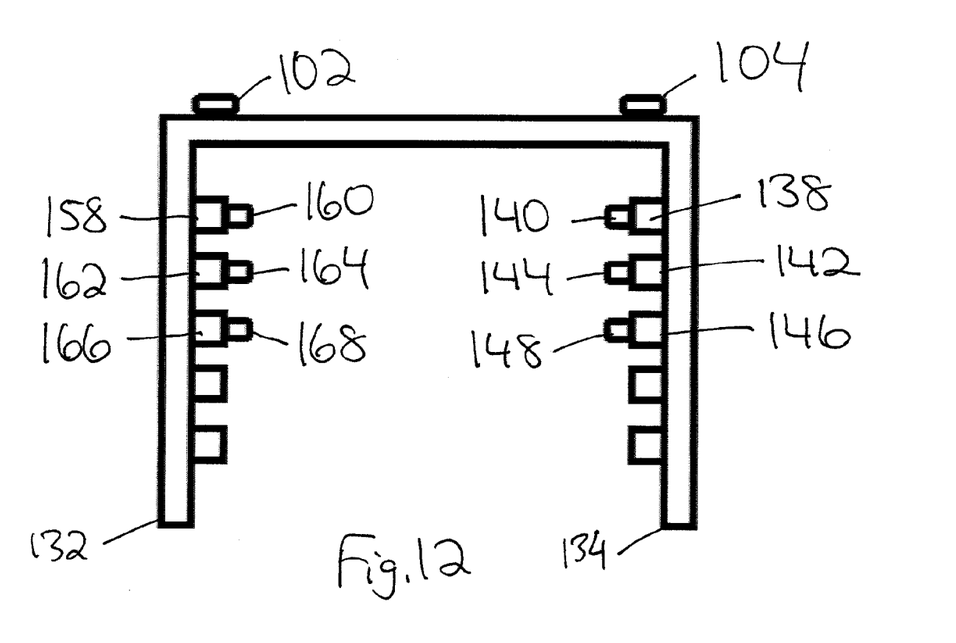
FIG. 12 is a top view thereof.

FIGS. 11 and 12 show the object detection device's ability to increase the amount of information relayed to the user. Sensors 102, 104 provide the information needed to activate stimulator fingers 140, 144, 160, 164, 168. Sensor 102 provides information regarding objects toward the left portion of the user's field of vision. Sensor 104 provides information regarding objects toward the right portion of the user's field of vision. The stimulators act according to the information provided by the appropriate sensor. FIG. 12 shows an embodiment in which the user could be approaching a centrally located object that has triggered both sensors 102, 104.

Figure 13:
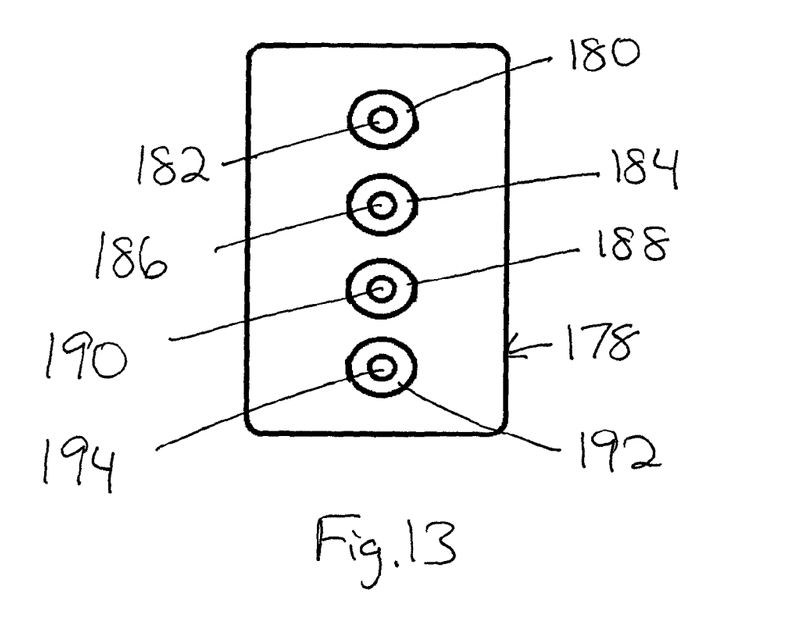
FIG. 13 is a rear view thereof.
Figure 14:
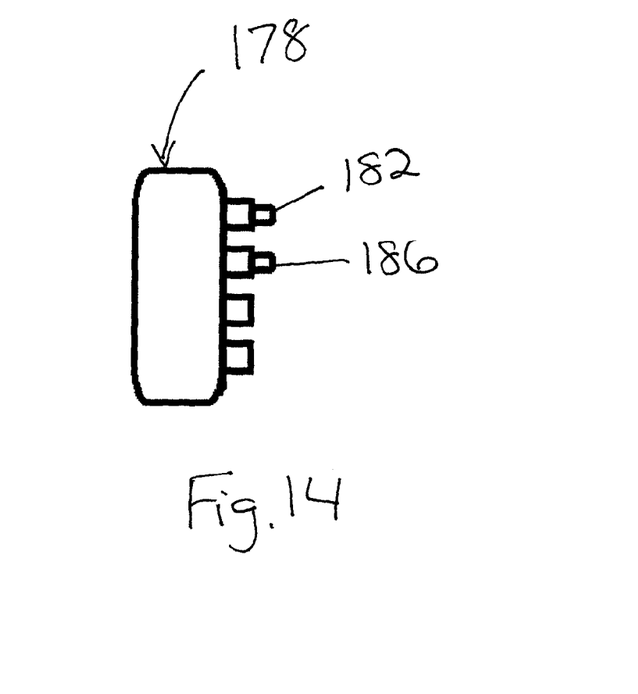
FIG. 14 is a side view thereof.

FIGS. 13-14 show another embodiment of the stimulators of the object detection device 178. The stimulators 180, 184, 188, 192 of this embodiment are not mounted on glasses. Instead, the stimulators 180, 184, 188, 192 are mounted in an approximately linear fashion to inform the user of the distance of the objects. Object detection device 178 may be configured on a housing that can be attached to the user. The object detection device 178 may be attached to a user's hat, an arm band, clothing, belt, or other clothing. The object detection device 178 may be attached by a clip or other known fastener to the user. The sensors may be included in the housing of the object detection device 178. The sensors may also be mounted elsewhere such as on the user, on a vehicle, etc. The sensors then communicate with the stimulators via a wired connection or wirelessly.

Figure 15:
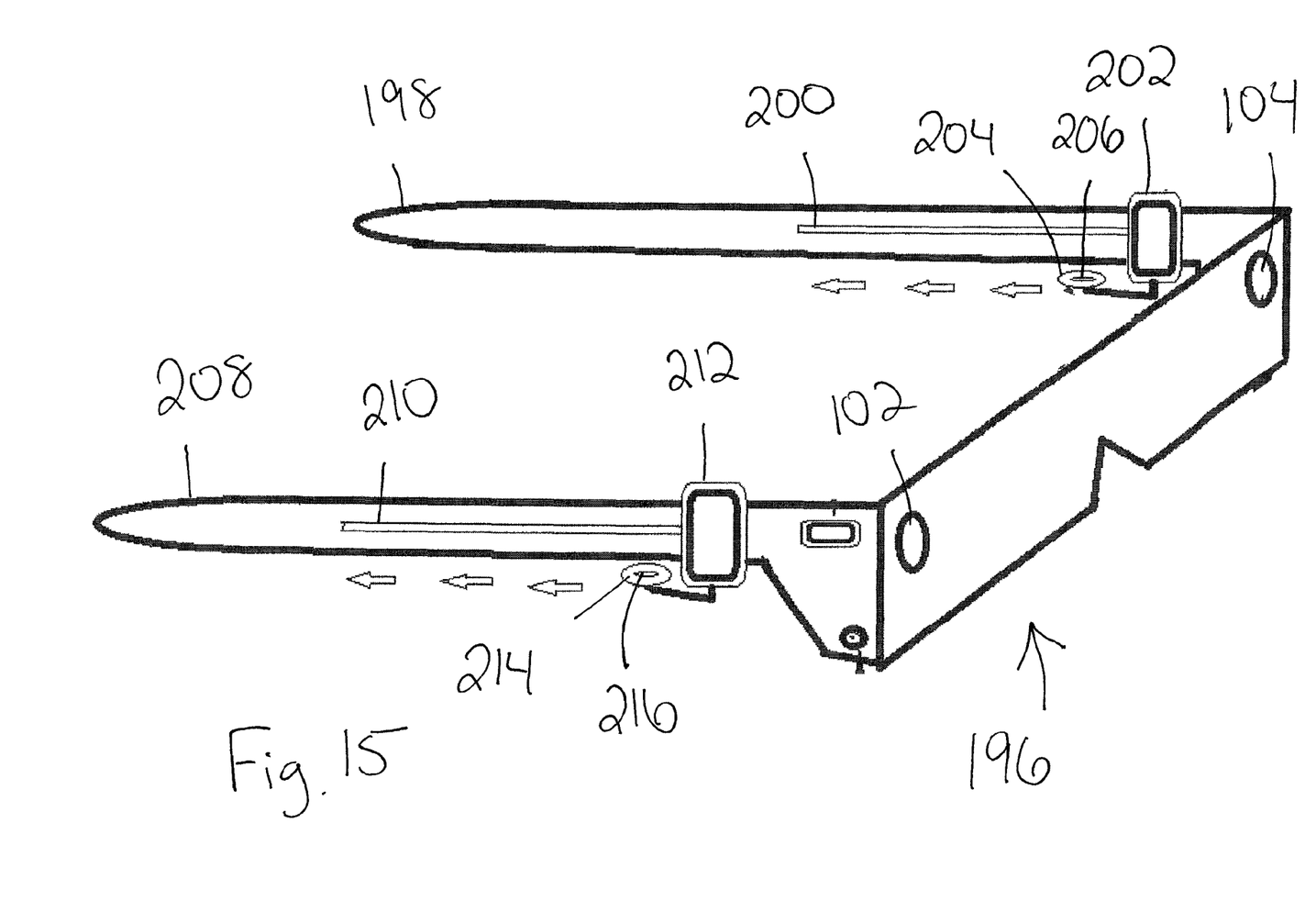
FIG. 15 is a perspective view of one embodiment of the present invention.

FIG. 15 shows another embodiment of the object detection device 196 in which a stimulator transport 202, 212 is used to notify the users of the distance of the object. As the distance between the user and the object decreases, the stimulator transport 202, 212 travels along path 200, 210 towards the user's ear. Each path 200, 210 is located on the stems 198, 208. The movement of the stimulator transport 202, 212 depends on the rate at which the distance between the user and the object changes. If the distance is increasing, the stimulator transport 202, 212 travels toward the user's temple. In another embodiment, the path may be reversed such that the stimulation transport travels toward the temple as the distance to the detected object decreases and the stimulation transport travels toward the ear as the distance to the detected object increases.

If a user detects an object with only one sensor 102, 104 the user will feel the stimulator 204, 214 along the side that the object is on in relation to the user. The user can utilize the simulators 204, 214 and stimulator fingers 206, 216 to determine object(s) position and proximity to the user, the speed at which the object is travelling and/or the user is approaching the object.

The stimulator transport 202, 212 travels toward the user's ear according to a scaled distance similar to the range at which a user is alerted to the object. The formula for calculating movement of the stimulator transport 202, 212 may be defined as follows:

$P\_Stimulation$=Position of stimulation transport $D\_Path$=Distance of Path $D\_Obj$=Distance of Object $D\_Range$=Distance to Begin Alerting User $P\_Stimulation=(D\_Path/D\_Range)*(D\_Range-D\_Obj)$ For example, if the object detection device 196 has a path 200, 210 with a distance of 2 inches and the object detection device 196 starts alerting the user at five feet (sixty inches), the formula will be as follows:

$P\_Stimulation=(2\ inches/60\ inches)*(60\ inches-D\_Obj)$

In such an example, position of the stimulation finger 206, 216 will be as follows:

| Distance of Object | Position of Stimulation Finger |
| --- | --- |
| 60 | 0 |
| 52.5 | 0.25 |
| 45 | 0.5 |
| 30 | 1 |
| 15 | 1.5 |
| 7.5 | 1.75 |
| 0 | 2 |

Such an embodiment provides scaled movement so that the user has more accurate information regarding the distance of the object. Another benefit of the stimulator transport is that the stimulator transports move in relation to the object. This benefit allows the user to gain an understanding at the rate of change of distance between the user and the object (e.g. the speed at which the object is approaching user and/or the speed at which the user is approaching the object).

In another embodiment, the object detection device could use sensors arranged in different configurations. The sensors may be oriented in any number of ways to give the user a sense of detecting objects not in the user's field of invention. The sensors could be placed behind the user or to the side in areas that would not be in the user's field of invention. This would allow the user to have a sense of having eyes in the back of his head. Such configurations could be useful for police, military, drivers, pilots, etc. A video game system could use an embodiment of the present invention to represent virtual things, objects, or situations for entertainment value. The preset invention could also be reconfigured to provide the user with information in a circular motion or any other motion or series of motions.

Another embodiment of the object detection device may be paired with a smart phone or GPS system that allows tracking of the user. The GPS system would allow the user to be updated with the user's actual location. The object detection device could inform the user of the user's current location. The object detection device could also identify addresses and buildings to the user. The GPS system could also warn the user when the user will be crossing the street and inform the user of crosswalks to cross the street.

The present invention has been described as using approximately linear configurations of stimulators. The stimulators may be arranged horizontally, vertically, diagonally, or in other configurations. The stimulators may also be arranged in different configurations as long as the user is informed as to the meaning of the contact of a stimulator at a specific contact point.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An object detection device that alerts a user of a detected object, the device comprising:
   a first sensor to detect the object;
   a first stimulator finger adjustable to a detected position and a clear position wherein the first stimulator finger adjusted to the detected position indicates that an object has been detected, the first stimulator finger adjusted to the clear position indicates that an object has not been detected;
   a first contact point wherein the stimulator finger adjusts to the detected position at the first contact point to indicate that a detected object is located within a first distance from the sensor; and
   a second contact point wherein the stimulator finger adjusts to the detected position at the second contact point to indicate that a detected object is located within a second distance from the sensor wherein the first distance is not equal to the second distance;
   a maximum alert distance defining the distance between the detected object and the sensor at which the stimulator finger will first adjust to the detected position;
   a stimulator transport positioning the stimulator finger at a contact point;
   a path that is traveled by the stimulator transport;
   a first end of the path wherein the stimulator transport is located at the first end of the path when an object is detected at the maximum alert distance;
   a second end of the path wherein the stimulator transport travels toward the second end of the path as the distance to the detect object decreases from the maximum alert distance;

wherein the stimulator transport travels along the path from the first end of the path to the second end of the path proportionately to the distance of the detected object from the sensor; and wherein the position of the stimulator transport on the path is calculated as the (distance between the first end of the path and the second end of the path divided by the maximum alert distance) multiplied by (the maximum alert distance subtracted by the distance to the detected).

2. An object detection device that alerts a user of a detected object, the object detection device mounted onto a pair of glasses, the device comprising:
- a first sensor to detect an object;
- a second sensor to detect an object;
- a first stimulator finger adjustable to a detected position and a clear position wherein the first stimulator finger adjusted to the detected position indicates that an object has been detected by the first sensor within a first distance from the first sensor, the first stimulator finger adjusted to the clear position indicates that an object has not been detected by the first sensor within the first distance, wherein the first stimulator finger operates independently from the objects detected by the second sensor, the first stimulator finger located on a first stem of the glasses; and
- a second stimulator finger adjustable to a detected position and a clear position wherein the second stimulator finger adjusted to the detected position indicates that an object has been detected by the second sensor within the first distance from the second sensor, the second stimulator finger adjusted to the clear position indicates that an object has not been detected by the second sensor within the first distance, the second stimulator finger located on a second stem of the glasses, wherein the second stimulator finger operates independently from the objects detected by the first sensor.

3. The device of claim 2 further comprising:
- a third stimulator finger adjustable to a detected position and a clear position wherein the third stimulator finger adjusted to the detected position indicates that an object has been detected by the first sensor within a second distance from the first sensor wherein the first distance is not equal to the second distance, the third stimulator finger adjusted to the clear position indicates that an object has not been detected by the first sensor within the second distance, wherein the third stimulator finger operates independently from the objects detected by the second sensor;
- a fourth stimulator finger adjustable to a detected position and a clear position wherein the fourth stimulator finger adjusted to the detected position indicates that an object has been detected by the second sensor within the second distance from the first sensor wherein the first distance is not equal to the second distance, the fourth stimulator finger adjusted to the clear position indicates that an object has not been detected by the second sensor within the second distance, wherein the fourth stimulator finger operates independently from the objects detected by the first sensor;
- a first distance range assigned to the first stimulation stimulator finger wherein the first stimulator finger adjusts to the detected position when the distance to the detected object is within the first distance range from the first sensor, the second stimulator adjusts to the detected position when the distance to the detected object is within the first distance range from the second sensor;
- a second distance range assigned to the third stimulation finger wherein the stimulation finger adjusts to the detected position when the distance to the detected object is within the second distance range from the first sensor, the fourth stimulator adjusts to the detected position when the distance to the detected object is within the second distance range from the second sensor, wherein the maximum distance of the first distance range is not equal to the maximum distance of the second distance range.

4. The device of claim 3 further comprising:
- a first stimulator that adjusts the first stimulator finger to the detected position and the clear position, the first stimulator associated with the first distance range;
- a second stimulator that adjusts the second stimulator finger to the detected position and the clear position, the second stimulator associated with the first distance range;
- a third stimulator that adjusts the third stimulator finger to the detected position and the clear position, the third stimulator associated with the second distance range;
- a fourth stimulator that adjusts the fourth stimulator finger to the detected position and the clear position, the fourth stimulator associated with the second distance range;
- a stimulator control that activates the first stimulator, the second stimulator, the third stimulator, and the fourth stimulator, the stimulator control activating the appropriate stimulator if the detected object is within the distance range associated with the stimulator, wherein the stimulator control activates the first stimulator and the third stimulator independent from the second sensor, the stimulator control activates the second stimulator and the fourth stimulator independent from the first sensor.

5. The device of claim 4 wherein at least one of the stimulators is a solenoid.

6. The device of claim 4 wherein at least one of the stimulators is a motor.

7. An object detection device that alerts a user of a detected object, the object detection device mounted onto a pair of glasses, the device comprising:
- a first sensor to detect an object towards the right portion of the user's field of vision;
- a second sensor to detect an object towards the left portion of the user's field of vision;
- a first stimulator set of at least two stimulator fingers located along a right stem of the glasses wherein the first stimulator set indicates that an object has been detected by the first sensor;
- a second stimulator set of at least two stimulator fingers located along a left stem of the glasses wherein the second stimulator set indicates that an object has been detected by the second sensor;
- the first stimulator set comprising:
- a first stimulator finger adjustable to a detected position and a clear position wherein the first stimulator finger adjusted to the detected position indicates that an object has been detected within a first distance from the first sensor, the first stimulator finger adjusted to the clear position indicates that an object has not been detected within the first distance from the first sensor; and
- a second stimulator finger adjustable to a detected position and a clear position wherein the second stimulator finger adjusted to the detected position indicates that an object has been detected within a second distance from the sensor wherein the first distance is not equal to the second distance, the second stimulator finger adjusted to the clear position indicates that an object has not been detected within the second distance from the first sensor;

the second stimulator set comprising:
- a first stimulator finger adjustable to a detected position and a clear position wherein the first stimulator finger adjusted to the detected position indicates that an object has been detected within the first distance from the second sensor, the first stimulator finger adjusted to the clear position indicates that an object has not been detected within the first distance from the second sensor; and
- a second stimulator finger adjustable to a detected position and a clear position wherein the second stimulator finger adjusted to the detected position indicates that an object has been detected within the second distance from the sensor wherein the first distance is not equal to the second distance, the second stimulator finger adjusted to the clear position indicates that an object has not been detected within the second distance from the second sensor.

8. The device of claim 7, the first simulator set further comprising:
- a first distance range assigned to the first stimulator finger wherein the first stimulator finger adjusts to the detected position when the distance to the detected object is within the first distance range;
- a second distance range assigned to the second stimulator finger wherein the stimulator finger adjusts to the detected position when the distance to the detected object is within the second distance range wherein the maximum distance of the first distance range is not equal to the maximum distance of the second distance range.

9. The device of claim 7, the second simulator set further comprising:
- a first distance range assigned to the first stimulator finger wherein the first stimulator finger adjusts to the detected position when the distance to the detected object is within the first distance range;
- a second distance range assigned to the second stimulator finger wherein the stimulator finger adjusts to the detected position when the distance to the detected object is within the second distance range wherein the maximum distance of the first distance range is not equal to the maximum distance of the second distance range.

10. The device of claim 7 wherein the first stimulator set operates independently from the second sensor.

11. The device of claim 7 wherein the second stimulator set operates independently from the first sensor.

12. The device of claim 7 further comprising:
- a divider distinguishing the first stimulator set from the second stimulator set.

13. The device of claim 7 wherein the first sensor detects objects for adjusting the first stimulator set wherein the detection of an object by the second sensor does not cause adjustment of the first stimulator set.

14. The device of claim 7 wherein the second sensor detects objects for adjusting the second stimulator set wherein the detection of an object by the first sensor does not cause adjustment of the second stimulator set.

15. The device of claim 13 wherein the second sensor detects objects for adjusting the second stimulator set wherein the detection of an object by the first sensor does not cause adjustment of the second stimulator set.

* * * * *